Aug. 15, 1939.  C. PFANSTIEHL  2,169,281
APPARATUS FOR FORMING SHAPED SMALL OBJECTS
Filed Nov. 5, 1937
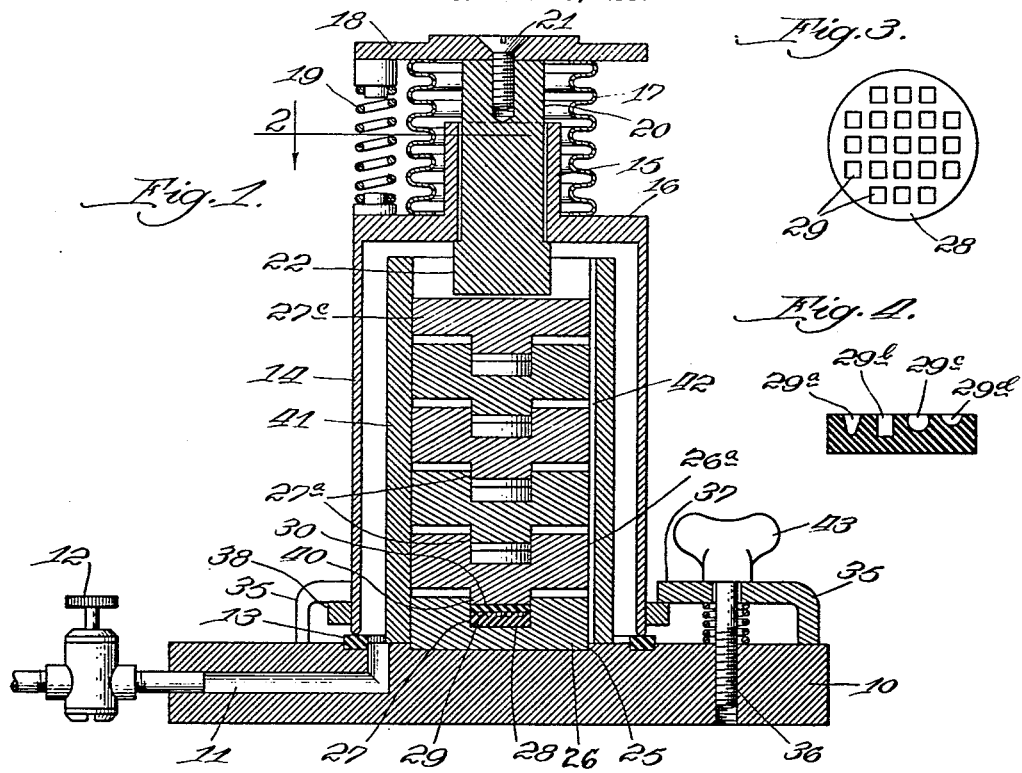
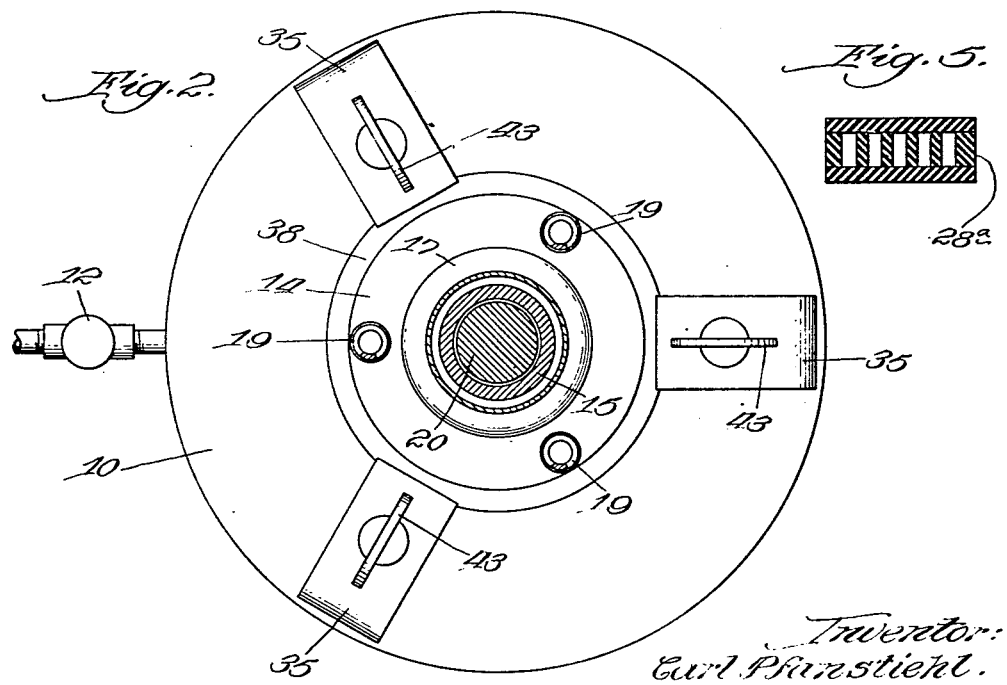

Patented Aug. 15, 1939

2,169,281

UNITED STATES PATENT OFFICE 2,169,281

APPARATUS FOR FORMING SHAPED SMALL OBJECTS

Carl Pfanstiehl, Highland Park, Ill., assignor to Pfanstiehl Chemical Company, a corporation of Illinois Application November 5, 1937, Serial No. 173,035

5 Claims. (Cl. 29—1)

This invention relates to an apparatus for forming small metallic objects of predetermined size and shape.

The pressing of metallic objects from powdered metallic particles is now well-known, but the development of suitable dies or methods for forming extremely small objects has hitherto been thought impracticable.

For example, the preforming of points for pen nibs, phonograph needles, meter pivots, or similar small objects, by pressing has hitherto been a very expensive process, and the objects formed by the previously known methods have not had the uniformity of size and structure desired.

In accordance with this invention, an apparatus is provided for forming in a very cheap and simple manner small objects of predetermined size and shape, primarily of geometric patterns and of a uniformity of structure hitherto impossible in such small objects.

An apparatus suitable for carrying out the invention is illustrated in the drawing, in which Fig. 1 is an elevation, partly in section, of the apparatus; Fig. 2 is a sectional plan view of the apparatus shown in Fig. 1; Fig. 3 is a top view of a mold; Fig. 4 is a sectional view through a modified mold; and Fig. 5 is a sectional view of another modified form of die.

As shown in the drawing, the apparatus comprises a base 10 pierced by a conduit 11 controlled by a valve 12 and leading to a vacuum pump (not shown). Resting upon the base 10 and separated therefrom by a rubber gasket 13 is a cylindrical container 14 provided with a neck 15 and to the shoulder 16 of which is welded or soldered a flexible Sylphon 17 of copper or other suitable material. The Sylphon is welded or soldered at the top to a plate 18, which is pressed upwardly by the springs 19. These springs are designed to offset the pressure of the atmosphere when the interior of the container is evacuated, and to prevent premature compression of the dies.

A plunger 20 is fastened by the screw 21 to the plate 18 and is preferably provided with an enlarged head 22.

A slight depression 25 is provided in the base 10 and within this is nested a rigid die-block 26 preferably steel having a depression 27 in its upper surface, within which the die 28 closely fits.

The die 28 is made of a plastic, preferably elastic, substantially incompressible material, preferably rubber such as rubber known as squeegee rubber, and is provided with a number of cavities 29 in its upper surface. The die is preferably not of great thickness, in order that there will not be any appreciable sliding of the die along the sides of the die-block. On the other hand, there should be an amount of material below the cavities sufficient to prevent flowage or distortion of the material.

Therefore, if the type 28a of die shown in Fig. 5 is employed, a suitable rubber washer should be applied above and below the die itself.

For pen point and similar purposes a die approximately 1/8 of an inch in thickness is satisfactory, and the cavities may be slightly more than one half of this thickness. A washer 30 is placed on the top of the die and the washer may suitably be about 1/16 of an inch thick.

The cavities in the die are made of precisely the same shape desired in the finished article, but are very considerably larger than the article itself, because of the change in the apparent density of the article which occurs upon compression. For most metallic powders, such as tungsten, osmium, iridium, or the like, the powder is compressed to one half to one quarter of the original volume under the necessary pressures.

In Fig. 4 a die is shown, in which a plurality of different shaped cavities are provided. 29a, for example, being suitable for a phonograph needle, 29b being a cylinder, 29c a spheroid, and 29d a hemisphere. In making a complete sphere, two molds such as 29d may be employed, being placed together in registration in any suitable manner before pressing.

Instead of elastic bodies, plastic inelastic materials may be employed, such as soft metal, say, lead. The use of an elastic body is greatly preferred because the die does not have to be destroyed after one use.

The container 14 is secured to the base 10 by fasteners 35, which are pivotally mounted at 36 and the edges 37 of which overhang the flange 38 on the container.

In the operation of the device, powdered metallic material is carefully sifted into the cavities 29. In general the powder is around 100 to 200 mesh. Too fine a material is likely to lower the apparent density below the normally desirable amount, and on the other hand, if the material is too coarse, it will not fill the cavities uniformly, nor will it bind as easily. Moreover, where a plurality of metallic materials are mixed, for example in forming an osmium-iridium or platinum alloy, uniformity of composition will not be accomplished with too large particles.

Sifting is preferred because there is no tendency to overpack or compress the powder in spots, but a vibrator may be employed to vibrate the dies while the material is falling into it. This is particularly desirable in case of a cavity shaped like 29c.

After the cavities have been filled, the upper surface is scraped with a flat edge and a die is placed in the die-block 26 and covered with a washer 30. A second die-block 26a is then placed on top of the first die-block, the second one having a lug 40 registering with the depression 27. The die-block 26a likewise has a die receiving depression 27a, in which a second die and washer are placed and this nesting of die-blocks is continued until the container is filled to the desired height. A closing die-block 27c is placed on top of the last die and is just below the plunger 22. A steel sleeve 41 closely fits the die-blocks and is provided with a longitudinal groove 42 to permit ready passage of air into and out of the die-blocks.

The separate nesting of the dies is of importance, because it is desirable not to have any die move any considerable distance with respect to the walls enclosing it. If a number of dies were piled on top of each other, the movement of the upper ones would be cumulative, whereas in the present arrangement, the cumulation is taken up between the die-blocks.

After the dies are properly mounted the container 14 is placed over them and the fasteners 35 secured by the wing nuts 43. The three-way valve 12 is then opened to a vacuum pump and the container evacuated, the springs 19 holding the plate 18 from compression by atmospheric pressure. Pressure is then applied on the plate 18 and operates through the plunger 20 to compress the dies under any suitable pressure. For most purposes a pressure of 35 to 70 tons per square inch is suitable.

The desired pressure will, of course, depend upon the character of the material being compressed as well as the purposes for which it is intended.

Under a pressure of 70 tons per square inch, a series of 5 dies and washers 1/8 of an inch in thickness and 1/16 of an inch in diameter and each containing 21 rectangular cavities approximately 5/128 inch by 8/128 inch, the washer being approximately 1/16 of an inch thick, will compress less than 1/8 of an inch total when filled with metallic powder having a 3 to 1 compression ratio.

The pressure need not be maintained more than a few seconds, and after release, air or other gas is admitted to the container and the resulting pellets are removed from the dies. For some purposes it is desirable that the gas be inert, such as hydrogen.

The pellets may then be treated in any desired manner, for example, by heat treatment below the melting point for a prolonged period.

The process is particularly suitable for the manufacture of small tips to be welded automatically to bases of considerably larger size, particularly pen points, phonograph needles, meter pivots, and the like. In such operations, it is quite valuable to have pieces of predetermined and uniform size and shape, so that the welding operation may proceed automatically and uniformly.

In the case of pen points, the particles are made from powdered pen point material, generally of a hard corrosion-resistant metal or alloy, and are made of a size preferably to produce 1800 to 10,000 pellets per troy ounce. A typical cube may have a side of .040 inch.

In some instances it may be desirable to omit the top washer or to use a washer of a rigid material. This provides a more smooth and shiny surface where the metal contacts metal.

The foregoing detailed description has been given for clearness only, and no unnecessary limitations should be understood therefrom, but the appended claims should be construed as broadly as permissible in view of the prior art.

I claim:

1. An apparatus for powder metallurgy comprising a series of die-blocks, means for nesting a plastic die in each of said blocks, and lost motion means between the blocks for taking up compression of the dies.

2. An apparatus comprising a closed container, a series of die-blocks within the container, a closely fitting sleeve about the die blocks, said sleeve being provided with an internal longitudinal groove to permit readily removal of air from the blocks, means for evacuating the container, and means for applying high pressure to the die blocks.

3. A die for small objects of predetermined size and shape comprising a rubber body containing a cavity of the predetermined shape, but of a size considerably greater than the predetermined size, and a rubber washer of substantially the same cross section as the die adapted to cover the cavity.

4. Apparatus for powder metallurgy comprising a series of die blocks, a cavity in each block for nesting a plastic die therein, said cavity being substantially deeper than the plastic die, and each die block in the series, except the lowermost, having on its under surface a depending member complementary to said cavity, said depending member providing a shoulder sufficiently wide to separate the upper and lower surface respectively of the adjacent die blocks when the plastic die is in the cavity.

5. An apparatus comprising a series of die blocks, each having a die cavity therein, serially nested together, a closely fitting sleeve about said die blocks, said sleeve being provided with an internal longitudinal groove communicating with the die cavity in each of said blocks, and means for applying high pressure to the die blocks.

CARL PFANSTIEHL.